Jan. 10, 1956  B. VONNEGUT  2,730,005

MEANS FOR DETECTING AEROSOL PARTICLES

Filed Oct. 9, 1951

Fig. 2.

Fig. 1.

Inventor:
Bernard Vonnegut,
by Paul A. Frank
His Attorney.

2,730,005

MEANS FOR DETECTING AEROSOL PARTICLES

Bernard Vonnegut, Alplaus, N. Y., assignor to General Electric Company, a corporation of New York Application October 9, 1951, Serial No. 250,515

8 Claims. (Cl. 88—14)

The present invention relates to a new and improved means for detecting particles.

More particularly, the invention relates to a new and improved, automatically and continuously operable means for detecting minute, solid particles suspended in a gaseous medium such as air.

In the surrounding atmosphere of all localities there is normally suspended a number of minute, solid particles, sometimes referred to as aerosols, which vary in size, chemical composition, and concentration depending upon the history of the air from which a sample is taken. Because these particles generally serve as condensation nuclei and ice forming nuclei about which droplets of water and ice crystals may form, information concerning them is of importance in understanding meteorological phenomena. For this reason it is desirable to obtain as much information as possible pertaining to the particles in a given locality, and to do so with as little effort as is necessary. Hence, there is a recognized need for an automatically and continuously operable method and means for detecting aerosol particles. While there are known aerosol particle detectors which are capable of automatically and continuously monitoring samples of a gaseous medium containing such particles, they derive a more or less integrated signal indicative of the total concentration of particles, and do not count the individual particles, or discriminate between particles of different size, or different chemical composition. Consequently, the known detectors of this type are inherently incapable of deriving as much information concerning the particles in a locality as might be desired, and are necessarily limited in their use.

It is therefore one object of the present invention to provide new and improved means for automatically and continuously detecting minute particles suspended in a gas which means is capable of obtaining a reliable and relatively complete measurement of the quantitative characteristics of the particles occurring in a sample of the suspending medium.

Another object of the invention is to provide a means of the above type which is capable of discriminating between particles of different size, and between particles of different chemical composition; and which is capable of deriving some indication of the size distribution of the particles, as well as a credible, representative count of the indvidual particles.

A further object of the invention is to provide a particle detecting apparatus having the above set forth characteristics which is relatively cheap to construct, and simple to operate.

In its broader aspects, the invention makes available in the art a new and improved means for detecting minute, solid particles suspended in a gaseous medium which includes the use of a means for energizing the particles in a sample of a medium being tested to cause the same to move in a predetermined path, and to emanate momentary flashes of light characteristic of the chemical elements of which they are composed. Optical means cooperate with the energizing means for effectively inspecting such momentary flashes of light occurring within a pre-selected cross section of the path, and coacting with the optical means is a light sensitive device which serves to derive an electrical signal indicative of the characteristics of the light flashes occurring in the inspected area whereby an indication is obtained of the number, the size, and the size distribution of the particles in the sample of the medium being tested.

As an extension of the basic features of the invention set forth above, the invention also makes available a means for detecting only those particles having a desired chemical composition by designing the above described detecting apparatus to respond to only those light flashes having a light frequency lying within a predetermined portion of the spectrum.

Many other objects, features, and attendant advantages of this invention will be appreciated more readily as the same becomes understood by reference to the following detailed description, when considered in connection with the accompanying drawings, wherein like parts are identified by the same reference character in each of the several figures and wherein: Fig. 1 is a schematic diagram of a preferred embodiment of a particle detecting apparatus for carrying out the novel particle detection method provided by invention; and Fig. 2 is a fragmentary, sectional view taken through plane 2—2 of the particle detecting apparatus shown in Fig. 1.

Referring now to Fig. 1 more specifically, the preferred embodiment of a detecting apparatus incorporating the invention in its design includes a burner means, indicated at 11, for producing a flame, shown at 12, of known spectral emission. The burner means 11 comprises a burner tip 13 having a plurality of axially extending ports therein, and a fuel supply and mixing chamber 14 having the burner tip 13 secured to one end thereof. Secured to the remaining end of fuel supply and mixing chamber 14 is a centrally bored plug 15 which has a tubular extension 16 projecting into chamber 14, and which is adapted to be connected to a source of primary fuel, such as hydrogen or the like, for producing flame 12. The tubular extension 16 extends into chamber 14 to a point opposite an opening formed by the juncture of an air supply conduit 17 having one end connected to chamber 14, and the remaining end adapted to be operatively connected to the medium being monitored.

Upon the centrally bored connector plug 15 being operatively connected to the source of primary fuel, a flow of fluid occurs through tubular extension 16 up into mixing chamber 14, and operates by well known jet lifting principle to draw in through conduit 17 a sample of the medium, generally air, being tested for minute, solid particles. The primary fuel and air drawn in through conduit 17 are then mixed in chamber 14, and pass out through the ports in burner tip 13 where the mixture is ignited and burns. Due to the relatively intense heat produced by the burning of the primary fuel and air drawn in through conduit 17, the particles entrained in the air are energized sufficiently to cause the same to move upwardly in a predetermined direction through the flame area 12, and to emanate momentary flashes of light having spectral characteristics determined by the chemical composition of the particular particle energized.

In order to observe or detect the flashes of light emanated from the energized particles, the apparatus includes an optical means in combination with the burner means for inspecting the momentary flashes of light thus occurring within a preselected area of the flame 12. This optical means preferably comprises a mask 18 disposed adjacent the flame area 12, and having an adjustable slit aperture 19 cut therein. As is best shown in Fig. 2, the slit aperture 19 extends in a direction transverse to the path of the flame 12, and serves to effectively inspect a preselected, relatively thin cross section of the path of the flame as the energized particles pass therethrough. To assure an accurate count of the particles occurring in the medium, the mask 18 is preferably constructed in a manner such that the thinness of the slit aperture 19 can be adjusted to pass only those light rays emanating from a very thin cross section of the path of flame 12, and to improve further the definition of the detector, a lens assembly 21 is disposed between mask 18 and flame 12 for producing a real image of the flame on aperture 19.

In operation, the mixture of primary fuel supplied through tubular extension 16, and the air containing the particles to be detected, is mixed in chamber 14, and is forced out through the ports in burner tip 13 where it is ignited. The resulting flame travels outwardly from the end of burner tip, and upwardly along a predetermined path, in the manner shown by the arrows in Fig. 2 of the drawings, and causes the minute, solid particles entrained in the air drawn through conduit 17 likewise to travel along the same path. Due to the heat produced by the flame, the particles moving through flame area 12 will be energized sufficiently to emanate flashes of light. Hence, as the energized particles pass through the preselected cross section of the flame 12 scanned by aperture 19, they will cause a sharp increase in the intensity of the light passing through aperture 19. If the aperture 19 is made sufficiently thin, and the particles are caused to travel along the path of the flame at a sufficiently high velocity, the sharp or pulsed increases in intensity of the light passing through aperture 19 can be made to approximate very closely the number of particles entrained in the air being sampled. Then by picking up the instantaneous variations in the intensity of light passing through aperture 19 with a suitable light-sensitive device, a reliable, representative count can be obtained of the number of individual particles occurring in the medium being sampled. Not only can a count of the individual particles be obtained by a detecting apparatus of the above described type, but because the amplitude and form of the instantaneous variation in the intensity of light rays passing through aperture 19 varies with the size of the particle energized, information is also obtained pertaining to the size of the particles, and to the size distribution of the particles. Thus, the novel particle detection method and apparatus is capable of providing a relatively complete measurement of the quantitative characteristics of the particles suspended in a gaseous medium such as air, the fluctuations in the light rays serving to measure the number of particles, the intensity of the rays indicating the size of the particles, and the light spectrum of the rays serving to show the chemical composition of the particles.

To further enhance the utility of the above-described particle detection method and apparatus, a detector constructed in accordance therewith may also include a means in combination with the above-described structure for selecting only those light flashes emanated from energized particles which have a desired chemical composition. This means preferably comprises a removable light filter assembly 22 positioned between the flame area 12 and the mask 18 in a manner such that all light rays reaching the aperture 19 must first pass therethrough. As is well known in classical physics, each of the primary elements found in nature has a characteristic spectral emission when energized; consequently, by including the filter assembly 22 in the detecting apparatus, the detector may be used to selectively detect only those particles having a certain chemical composition. If desired, the same result may be achieved by the use of a spectroscope in combination with the detecting apparatus. In such a combination, the removable filter assembly 22 is eliminated, and the spectroscope utilized in its place to separate out only those flashes of light having the desired spectral emission. Adverting again to Fig. 1, the detecting apparatus also includes a light sensitive device physically disposed adjacent the above described optical means, in a manner such that the light passing through aperture 19 in mask 18 impinges thereon, and which serves to convert the varying intensity light flashes produced by the energized particles in flame 12 sweeping across that portion of the flame area scanned by aperture 19 into an electrical signal indicative of the characteristics of particles contained in the medium being sampled. The light sensitive device preferably comprises a light sensitive tube 23 of the photo emissive type positioned so that the varying intensity light rays passing through aperture 19 impinge on the light sensitive electrode 24 thereof, thereby giving rise to a flow of electrons between the electrodes of the tube that varies in accordance with the instantaneous variations in the intensity of the light reaching electrode 24. In detectors for use in general counting applications where the chemical composition of the particle detected is not of importance, the light sensitive electrode 24 is constructed of a material such that the tube will respond to light flashes spaced over a very wide range of the spectrum; however, if the detector is to be used for counting only those particles having a particular chemical composition, the electrode 24 may be constructed of a material such that the frequency response curve of the tube generally matches the spectral emission curve of the chemical composition to be detected.

The output of light sensitive tube 23 is coupled across the input of a pulse shaping circuit 25 having a relatively wide pulse repetition response characteristic, and which serves to eliminate any steady state component of the signal developed in tube 23 by reason of the constant illumination produced by flame 12. Circuit 25 also serves to properly shape the alternating electrical signal produced by light sensitive tube 23 in response to the instantaneous variations in the intensity of the light rays passing through aperture 19 prior to applying the same to the input of a counting and indicating device 26. The counting and indicating device 26 may comprise any standard counting circuit for producing a count of the individual pulses applied thereto by circuit 25, and for deriving either a permanent record of the pulse count, or an instantaneous indication of such count.

For certain problems, it may prove desirable to utilize the above-described novel detector for counting only those particles suspended in a medium which are of a given size or greater. In order to do this, advantage may be taken of the fact that the intensity and form of the instantaneous variation in the intensity of the light ray passing through aperture 19, is dependent upon the size of the particle. Consequently, it is possible to count only those particles of a given size with the detector by adjusting the sensitivity of the counting portion of the detector so that it produces an indication of only those instantaneous variations in the intensity of the light rays passing through aperture 19 which are of a preselected amplitude. This may be accomplished by either adjusting the sensitivity of the light sensitive tube 23 so that the same responds to only those instantaneous variations of the light rays which reach the preselected intensity, or adjusting the sensitivity of the pulse shaping circuit 25 to cause the same to respond to only those variations of the electrical signal produced by tube 23 reaching a given amplitude. It should be noted however that such adjustments are not required in order to obtain some indication of the size and size distribution of the particles being detected, for the information may be obtained from an analysis of the output of indicating device 26, and need not necessarily be obtained by rendering the over-all response of apparatus insensitive to particles smaller than a given size.

For the purpose of convenience, the burner means and optical means of the above-described particle detecting apparatus may be assembled in a unitary housing structure which includes a generally cylindrical combustion chamber 27 having the mixing chamber 14 secured to the bottom surface thereof with the burner tip 13 located therewithin, and having an exhaust outlet 28 formed in the top. The burner tip 13 is positioned in combustion chamber 27 in a manner such that flame 12 is located opposite an observation port formed in the side of chamber 27 by the juncture of a generally cylindrical supporting tube 29. The supporting tube 29 has the lens assembly 21 and removable filter assembly 22 supported therein along with the adjustable mask 18 which is secured to the free end thereof, and together with the combustion chamber 27, serves to hold the various elements of the detecting apparatus in operative assembled relation. Because of the relatively large amount of heat generated by flame 12, and the consequent possibility of injuring filter assembly 22, or lens assembly 21, a heat insulating window 30 may be supported in tube 29 between the flame 12 and elements 21 and 22 to protect the same. The window 30 is constructed of a material which is transparent to light, but prevents the transmission of heat therethrough, and is preferably disposed immediately adjacent flame 12. Further, while the above described construction comprises the preferred manner of mounting the various components of the detector; it should be understood that the invention is not restricted to assembling of the elements of the apparatus in the specific manner disclosed.

From the foregoing description, it can be appreciated that the invention provides a new and improved, automatically and continuously operable method and means for detecting minute, solid particles suspended in a gaseous medium which is capable of obtaining a reliable representative count of the individual particles occurring in the medium. The method and means for detecting particles is also capable of measuring the size of the particle, the size distribution of the particles, and of discriminating between particles of different chemical composition. Moreover features of the invention may be embodied in an apparatus that is relatively cheap to construct, and simple to operate. Further, while the invention has been described for use in connection with the detection of aerosol particles suspended in air, it should be appreciated that the invention is not necessarily restricted in its use to detection of aerosol particles, but might very well be satisfactorily used to detect any minute solid particles suspended in a gaseous medium.

Obviously, other modifications and variations of the present invention are possible, and will occur to those well versed in the art, in the light of the above teachings. It is, therefore, to be understood that changes may be made in the specific apparatus described herein which are within the full intended scope of the invention as defined by the appended claims.

What I claim as new and desire to secure by Letters Patent of the United States is:

1. A detector for minute particles suspended in a gaseous medium including means for energizing and imparting movement to the particles in a sample of the medium being tested to cause the same to emanate momentary flashes of light and to move in a predetermined direction, optical means disposed adjacent the path of movement of said particles for effectively inspecting the momentary flashes of light thus occurring within a preselected cross section of the path as the energized particles pass through the same, a light sensitive device disposed adjacent said optical means and cooperating therewith to derive an electrical signal indicative of the characteristics of the particles in the medium, and a pulsed electric signal responsive indicating circuit coupled to said light-sensitive device for deriving a count of only the increased intensity momentary light flashes occurring within the preselected area.

2. A detector for minute particles suspended in a gaseous medium including means for energizing and imparting movement to the particles in a sample of the medium being tested to cause the same to emanate momentary flashes of light and to move in a predetermined direction, optical means disposed adjacent the path of movement of said particles for effectively inspecting the momentary flashes of light thus occurring within a preselected cross section of the path as the energized particles pass through the same, a light sensitive device disposed adjacent said optical means and cooperating therewith to derive an electrical signal indicative of the characteristics of the light flashes occurring in the inspected area, said light sensitive device being responsive only to light flashes having a light frequency within a preselected portion of the spectrum, and a pulsed electric signal responsive indicating circuit coupled to said light-sensitive device for deriving a count of only the increased intensity momentary light flashes occurring within the preselected area.

3. A detector for minute particles suspended in a gaseous medium including means for energizing and imparting movement to the particles in a sample of the medium being tested to cause the same to emanate momentary flashes of light and to move in a predetermined direction, optical means disposed adjacent the path of movement of said particles, said optical means including means for effectively inspecting only the momentary flashes of light thus occurring within a preselected cross section of the path as the energized particles pass through the same, and light selective means disposed adjacent said inspecting means and cooperating with the same to selectively pass only those light flashes having a desired light frequency, a light sensitive device disposed adjacent said optical means in a position such that the light passing through said means impinges thereon and develops an electrical signal indicative of the quantitative characteristics of the light flashes having a predetermined light frequency which occur in the inspected area, and a pulsed electric signal responsive indicating circuit coupled to said light-sensitive device for deriving a count of only the increased intensity momentary light flashes occurring within the preselected area.

4. A detector for minute particles suspended in a gaseous medium including burner means for producing a flame of known characteristics, means for introducing a sample of the medium being tested into the flame produced by said burner means whereby the particles contained in the medium are energized and are caused to emanate momentary flashes of light, optical means for observing such flashes of light including a mask disposed adjacent said flame and having a slit aperture therein extending transverse to the path of the flame produced by said burner means, an electrically operable light sensitive device disposed adjacent said mask and having the light passing through said slit aperture impinging thereon for producing an electric signal indicative of the quantitative characteristics of the particles in the medium being tested, and a pulsed electric signal responsive indicating circuit coupled to said light-sensitive device for deriving a count of only the increased intensity momentary light flashes occurring within the preselected area.

5. A detector for minute particles suspended in a gaseous medium including burner means for producing a flame of known spectral emission, means for introducing a sample of the medium being tested into the flame produced by said burner means whereby the particles contained in the medium are energized and are caused to emanate momentary flashes of light, optical means for observing such flashes of light, said optical means including a mask disposed adjacent said flame and having a slit aperture therein extending transverse to the path of the flame produced by said burner means, and light selective means disposed adjacent said mask for selectively passing only those flashes of light having a frequency lying within a desired portion of the spectrum, an electrically operable light sensitive device disposed adjacent said optical means and having the light passing therethrough impinging thereon for producing an electric signal indicative of the quantitative characteristics of the particles in the medium being tested that have a desired chemical composition, and a pulsed electric signal responsive indicating circuit coupled to said light-sensitive device for deriving a count of only the increased intensity momentary light flashes occurring within the preselected area.

6. A detector for minute particles suspended in a gaseous medium including burner means for producing a flame of known spectral emission and moving along a predetermined path, means for introducing a sample of the medium being tested into the flame produced by said burner means whereby the particles contained in the medium are energized sufficiently to emanate momentary flashes of light and are caused to move along the path of said flame, optical means for observing such momentary flashes of light, said optical means including a mask disposed adjacent said flame having a slit aperture therein extending transverse to the path of the flame produced by said burner, and light selecting means for selectively passing only those flashes of light having a frequency lying within a desired portion of the spectrum, an electrically operable light sensitive device disposed adjacent said optical means and having the light passing therethrough impinging thereon for producing an electrical signal indicative of the quantitative characteristics of particles in the medium being tested that have a desired chemical composition, and pulsed electric signal responsive indicating circuit means operatively coupled to said light sensitive device for converting the electrical signal produced thereby to a perceptible indication of the number of such particles occurring in the medium being tested.

7. A detector for minute particles suspended in a gaseous medium comprising a combustion chamber having an observation port therein, burner means disposed in said combustion chamber for producing a flame observable through said observation port, means for introducing a sample of the medium to be tested into said flame area whereby minute particles contained therein are caused to emanate momentary flashes of light, optical means disposed adjacent said combustion chamber opposite said observation port for effectively inspecting the momentary flashes of light emanated by said particles within a preselected area of the flame, said optical means including a mask having a slit aperture therein extending transverse to the direction of travel of the flame, an electrically operable light sensitive device disposed adjacent said mask and having the light passing through said slit aperture impinging thereon for deriving a signal indicative of the characteristics of the particles, and pulsed electric signal responsive indicating circuit means operatively coupled to said light sensitive device for producing a perceptible indication of the number of such particles occurring in the medium being tested.

8. A detector for minute particles suspended in a gaseous medium comprising a combustion chamber having an observation port therein, burner means disposed in said combustion chamber for producing a flame of known characteristics and observable through said observation port, means for introducing a sample of the medium to be tested into said flame area whereby the particles contained therein are caused to move along the flame path and to emanate momentary flashes of light having spectral characteristics determined by the chemical composition of the particles, optical means disposed adjacent said combustion chamber opposite said observation port for effectively inspecting the momentary flashes of light occurring within a preselected area of the flame, said optical means including light selective means for selectively passing the light flashes having a frequency lying within a desired portion of the spectrum, and a mask having a slit aperture therein extending transverse to the path of the flame, an electrically operable light sensitive device disposed adjacent said optical means and having the light passing through said slit aperture impinging thereon for deriving a signal indicative of the quantitative characteristics of the particles having a given chemical composition, and pulsed electric signal responsive indicating circuit means operatively coupled to said light sensitive device for producing a perceptible indication of the number of such particles occurring in the medium.

References Cited in the file of this patent

UNITED STATES PATENTS

| | | |
|---|---|---|
| 1,991,599 | Davis | Feb. 19, 1935 |
| 2,042,095 | Grant | May 26, 1936 |
| 2,076,554 | Drinker et al. | Apr. 13, 1937 |
| 2,109,235 | Kott | Feb. 22, 1938 |
| 2,212,211 | Pfund | Aug. 20, 1940 |
| 2,333,791 | Hutchison | Nov. 9, 1943 |
| 2,379,158 | Kalisher | June 26, 1945 |
| 2,532,687 | Weichselbaum | Dec. 5, 1950 |

FOREIGN PATENTS

| | | |
|---|---|---|
| 440,947 | Great Britain | Jan. 8, 1936 |
| 599,190 | Great Britain | Mar. 8, 1948 |

OTHER REFERENCES

Harrison et al.: Text "Practical Spectroscopy," 1948, page 437, published by Prentice-Hall Inc., New York City.

Trade publication Bulletin No. 151-A, "The Weichselbaum-Varney Universal Spectrophotometer," pages 1–6, published by Scientific Instruments Division, 11801 W. Olympic Blvd., Los Angeles, Calif., received in Division 7, October 23, 1950.